Patented July 16, 1935

2,008,045

UNITED STATES PATENT OFFICE 2,008,045

MANUFACTURE OF AROMATIC NITROCOMPOUNDS

Kenneth Carl Simon, Woodbury, N. J., assignor to E. I. du Pont de Nemours & Company, Wilmington, Del., a corporation of Delaware No Drawing. Application February 23, 1934, Serial No. 712,614

6 Claims. (Cl. 260—142)

This invention relates to a process for the preparation of aromatic nitrocompounds and more particularly to the improved separation of such compounds from their spent nitration acids, whereby increased yields may be obtained and the duration of the separation process shortened.

The manufacture of aromatic nitrocompounds is carried out ordinarily by the nitration of the corresponding hydrocarbon or other starting material by means of a so-called mixed acid, comprising sulfuric acid, nitric acid, and water in varying proportions, the sulfuric acid content usually being above 50%. In the production of nitrobenzene, for example, benzene is nitrated by the use of an acid which may have a composition within the limits of 50 to 60% $H_2SO_4$, 15 to 45% $HNO_3$, and 5 to 20% $H_2O$. At the end of the nitration operation, the charge from the nitrator, consisting of nitrobenzene and spent acid, is allowed to settle in a suitable container, whereby a separation into layers results. The spent acid can then be drawn off, leaving the nitrobenzene ready for neutralization and washing.

Under certain conditions, it has been found that the nitrobenzene becomes so emulsified that a satisfactory separation either does not take place or is very slow in reaching approximate completion. Such long separations are costly, since there is a considerable loss of sulfuric acid that is subsequently neutralized with the acid nitrobenzene, as well as a loss of time.

The object of my invention is an improved process for the treatment of the mixture of nitrocompound and spent acid, resulting from a nitration operation, whereby acid losses in the separation process are minimized. A further object is such a process in which a substantially complete separation of the nitrocompound from the acid layer takes place. A still further object is a process for the treatment of the mixture resulting from the nitration of benzene, whereby the separation of nitrobenzene from the spent acid is facilitated by the addition to the liquid mixture of a suitable accelerating material. Additional objects will become apparent as the invention is further described.

I have found that the foregoing objects are accomplished if a relatively small quantity of an absorbent silicious material is added to the nitrator charge, comprising a nitrated aromatic compound and spent acid, prior to the removal of the acid from the settling container. Various materials of this nature may be used, for example, kieselguhr, fuller's earth, asbestos, glass wool, and the like. Preferably, however, I employ kieselguhr as the agent for accelerating the separation of the two layers of material. Kieselguhr has high absorptive power and is at the same time most resistant to the attack of acids, since it approaches more nearly to pure silica than the other materials mentioned.

Using kieselguhr as the accelerating agent, in an amount of ¼ to 2 pounds for a 5,000 pound nitrobenzene charge, it has been found that the emulsion of nitrobenzene and acid breaks up completely in some cases and almost completely in all cases, under conditions where emulsions had formed, that, without the use of accelerant, would not clear up satisfactorily in a week's time. The presence of such emulsions ordinarily would mean unduly long separating times and considerable loss of material.

As a specific example of the method of carrying out my process, the following will serve. About 6,200 pounds of mixed acid is introduced into the nitrating vessel, the mixed acid having an approximate composition of 53% $H_2SO_4$, 38% $HNO_3$, and 9% $H_2O$. Agitation of the acid is started and about 3300 pounds of benzene are added. After a period of say 15 minutes, the nitration is complete. About 2 minutes before agitation is stopped, ¾ pound of kieselguhr is added. After thorough mixture, the entire contents of the nitrator are dropped to a settling tub. The spent acid at the bottom of the tub is then drawn off, after which the layer of acid nitrobenzene is ready for neutralization, washing, and final purification.

The advantages resulting from my invention will be apparent when it is considered that in the nitration of benzene, under certain conditions, emulsions are encountered that vary from 3 to 10" in depth in the settling tubs. Furthermore, with no treatment by accelerating agents, such emulsions can not be broken up. The addition of kieselguhr or other similar material, however, as illustrated in the example, brings about a speedy and complete separation into layers. Without the use of a separating agent, losses of 2 to 8% of the sulfuric acid may be encountered.

In disclosing the application of my process, I have described more particularly the separation of nitrobenzene from spent acids. It will be apparent, however, that the invention is applicable in the case of all aromatic nitrocompounds emulsifiable with spent acids, particularly those nitrocompounds that are liquid at or near atmospheric temperatures. The use of kieselguhr as accelerating agent has been particularly described. As stated heretofore, however, fuller's earth may be used with entire satisfaction, as well as other absorbent silicious materials. I intend, therefore, to be limited only as indicated by the following patent claims.

I claim:

1. The process of facilitating the separation of emulsifiable aromatic nitrocompounds from acid solutions which comprises adding an insoluble absorbent silicious material to the liquid mixture prior to the removal of the acid.

2. In the manufacture of aromatic nitrocompounds emulsifiable with acid solutions, the step of facilitating the separation of the nitrocompound from the spent acid by adding an insoluble absorbent silicious material to the nitrator charge prior to the removal of the acid.

3. The process of facilitating the separation of nitrobenzene from acid solutions which comprises adding an insoluble absorbent silicious material to the liquid mixture prior to the removal of the acid.

4. In the manufacture of nitrobenzene, the step of facilitating the separation of the nitrobenzene from the spent acid by adding an insoluble absorbent silicious material to the nitrator charge prior to the removal of the acid.

5. The process according to claim 4, in which the absorbent silicious material is kieselguhr.

6. The process according to claim 4, in which the absorbent silicious material is fuller's earth.

KENNETH C. SIMON.